United States Patent [19]
Young

[11] Patent Number: 5,461,941
[45] Date of Patent: Oct. 31, 1995

[54] SELF-LOCKING DIFFERENTIAL GEAR

[75] Inventor: Alastair J. Young, Kenilworth, United Kingdom

[73] Assignee: Automotive Products, plc, Leamington Spa, England

[21] Appl. No.: 157,131
[22] PCT Filed: Mar. 18, 1993
[86] PCT No.: PCT/GB93/00555
§ 371 Date: Dec. 6, 1993
§ 102(e) Date: Dec. 6, 1993
[87] PCT Pub. No.: WO93/21462
PCT Pub. Date: Oct. 28, 1993

[30] Foreign Application Priority Data

Apr. 15, 1992 [GB] United Kingdom ............... 9208346

[51] Int. Cl.[6] ........................... F16H 35/04
[52] U.S. Cl. .................. 74/650; 475/231; 475/236
[58] Field of Search ................. 74/650; 475/231, 475/236, 160

[56] References Cited

U.S. PATENT DOCUMENTS 2,651,214 9/1953 Randall ............................ 74/650
2,938,407 5/1960 Nallinger et al. ................. 74/650
4,954,122 9/1990 Nakao et al. ..................... 475/160
5,062,320 11/1991 Parsons et al. ................... 74/650

Primary Examiner—Rodney H. Bonck
Assistant Examiner—Peter Kwon
Attorney, Agent, or Firm—Paul E. Milliken; Lee A. Germain

[57] ABSTRACT

A differential mechanism having two output cam members, each having a single annular cam surface with pairs of inclined surfaces. Relative contra rotation of the output cam members cause cam followers to slide axially, and a housing engages the cam followers which are slideably supported by the housing moving the followers circumferentially relative to the output cam members. The two cam output members are thrust axially against the housing during drive of the cam output members through the followers and at least one cam output member acts against the housing through a friction thrust washer. This mechanism allows control of the torque ratio between inside and outside output shafts of a vehicle when turning a corner.

8 Claims, 2 Drawing Sheets

SELF-LOCKING DIFFERENTIAL GEAR

FIELD OF THE INVENTION

The invention relates to a differential mechanism particularly but not exclusively for use in motor vehicles.

BACKGROUND OF THE INVENTION

Differential mechanisms commonly used on vehicles are of the sun and planet gear type and have a well known disadvantage that when one wheel is on a slippery surface such as mud or ice and the other wheel is on a firm surface capable of providing traction, the first wheel will simply spin as it receives all the available power transmitted to the differential.

Limited slip differential mechanisms have been proposed in an attempt to overcome this problem which restrict the extent to which one wheel can spin relative to the other but such differentials are more complex and, therefore, more costly to produce.

In European patent application EP-A-0326289 there is proposed an alternative differential mechanism comprising two output cam members rotatable about an axis, each said member having a single annular cam surface thereon of undulating form comprising pairs of mutually inclined surfaces, one of said cam members having a different number of said pairs of inclined surfaces thereon than the other of said cam members, the cam surfaces on the cam members being frusto conical and converging towards each other, and a plurality of cam followers having end surfaces engaging the cam surfaces of the output cam members, the arrangement being such that relative contra rotation of said output cam members causes the cam followers to slide axially, and an input element engaging the followers which are slidably supported by the input element and moving the followers circumferentially relative to the output cam members, the input element engaging with a radially outer portion of each cam follower to move the follower circumferentially relative to the cam output members, and supporting the two cam output members against axially outward movement during drive of the cam output members through the followers.

Such a differential will hereinafter be called a differential of the type referred.

In a preferred embodiment of the above differential the two cam output members engage the input element through respective roller element bearings.

A problem associated with this type of differential is that because of the different number of pairs of inclined surfaces on one cam surface as compared with the other cam surface, the differential gives different torque ratios for cornering left and right hand bends.

One method of relieving this problem would be to increase the number of cam followers which reduces the differences. However this solution would increase the tendency of the followers to tip, if the followers depth remains constant. This increases the stress and wear in the differential.

Another method of altering the torque ratio would be to reduce the cam angles. However this also increases axial loading on the followers raising stress and wear.

According to the invention there is provided a differential of the type referred, wherein at least one cam output member is in frictional engagement with the input element. Frictional engagement with one output member helps to equalise the torque ratio between left and right hand. If there is frictional engagement between both output members and the input element the torque ratio for the differential can be raised.

Preferably the frictional engagement between said one output member and input element is different to the frictional engagement between the other cam output member and the input element.

Preferably one cam output member frictionally engages the input element through a thrust washer which is rotationally fast with one of the input element and said one cam output member, and frictionally engages the other thereof.

Conveniently one of said cam output members has n pairs of surfaces thereon and the other of said cam output members has n−1 pairs of surfaces thereon, wherein the one cam output member having n pairs of surfaces thereon frictionally engages the input element through a higher friction loss device than said other output member.

Such a solution to the problem is particularly useful for rear wheel drive differentials which usually require a higher torque ratio than front wheel drive differentials.

Also according to the invention there is provided a differential of the kind referred, wherein at least one of said cam output members is caused to frictionally engage the input element through a friction washer, the frictional engagement being selected to provide a desired torque ratio.

SUMMARY OF THE INVENTION

This invention is a differential mechanism comprising two output cam members rotatable about an axis, each said member having a single annular cam surface thereon of undulating form comprising pairs of mutually inclined surfaces, one of said cam members having a different number of said pairs of inclined surfaces thereon than the other of said cam members, the cam surfaces on the cam members being frusto conical and converging towards each other, and a plurality of cam followers having end surfaces engaging the cam surfaces of the output cam members, the arrangement being such that relative contra rotation of said output cam members causes the cam followers to slide axially, and an input element engaging the followers which are slidably supported by the input element and moving the followers circumferentially relative to the output cam members, the input element engaging with a radially outer portion of each cam follower to move the follower circumferentially relative to the cam output members, and supporting the two cam output members against axially outward movement during drive of the cam output members through the followers, wherein the output cam member having the higher number of pairs of inclined surfaces thereon frictionally engages the input element with a higher frictional force than the other output cam member in order to reduce the difference between the torque output ratio of the output cam members when making a right-hand turn compared with the torque output ratio when making a left-hand turn.

BRIEF DESCRIPTION OF THE DRAWINGS

Differential mechanisms in accordance with the invention will now be described by way of example with reference to the accompanying drawings in which.

DESCRIPTION OF THE PREFERRED EMBODIMENTS

Figure 1:
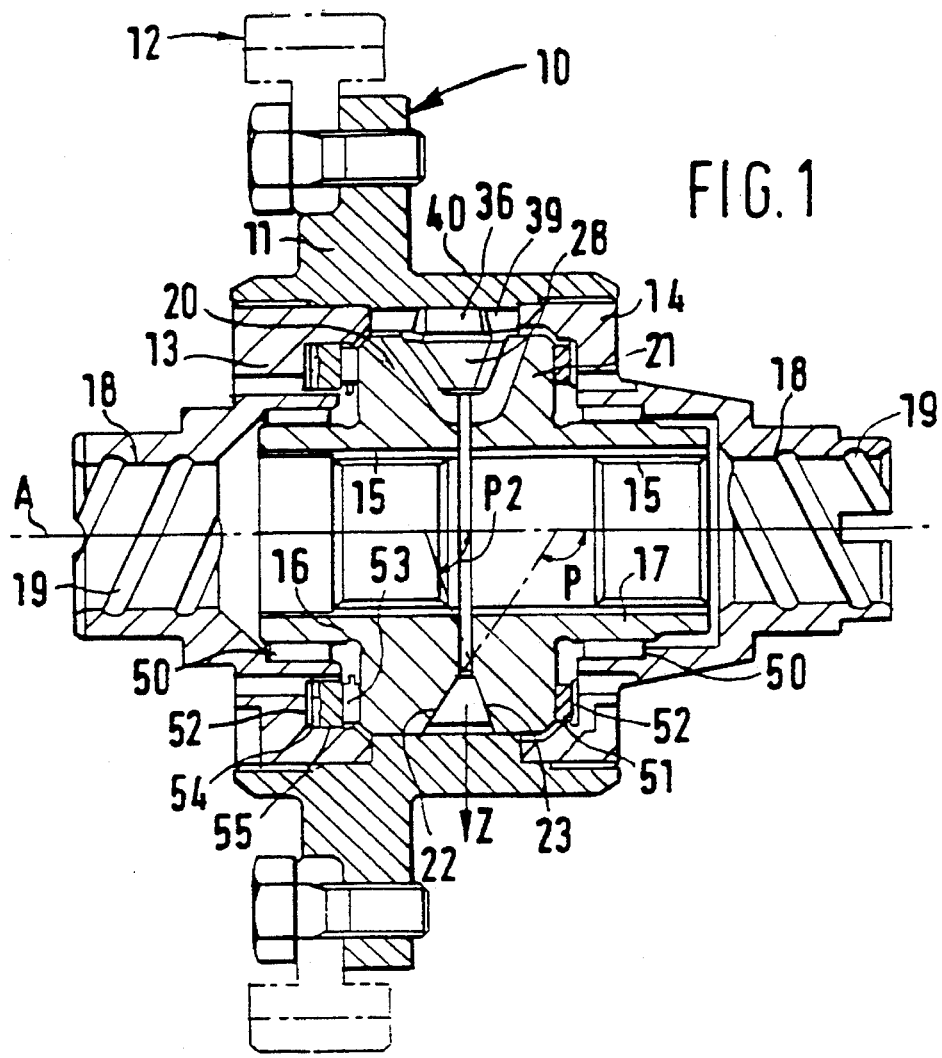
FIG. 1 is a cross section through a differential mechanism in accordance with the invention taken through output cam members.
Figure 2:
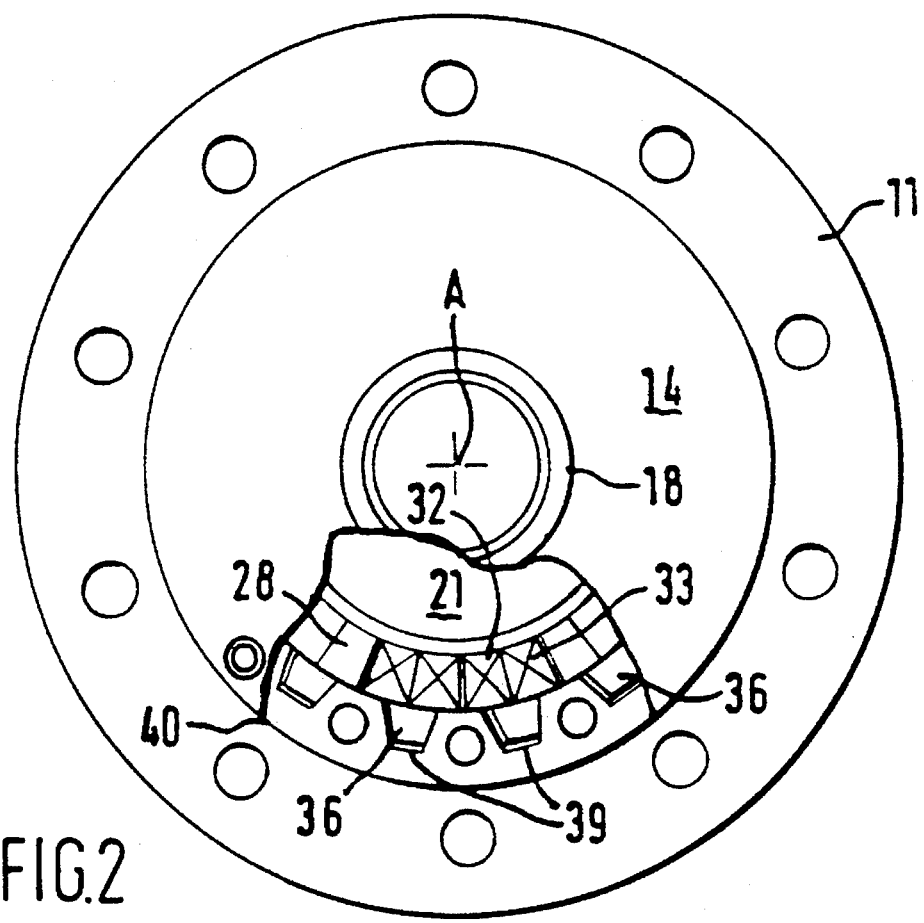
FIG. 2 is an end view of the differential of FIG. 1 shown partly broken away.
Figure 3:
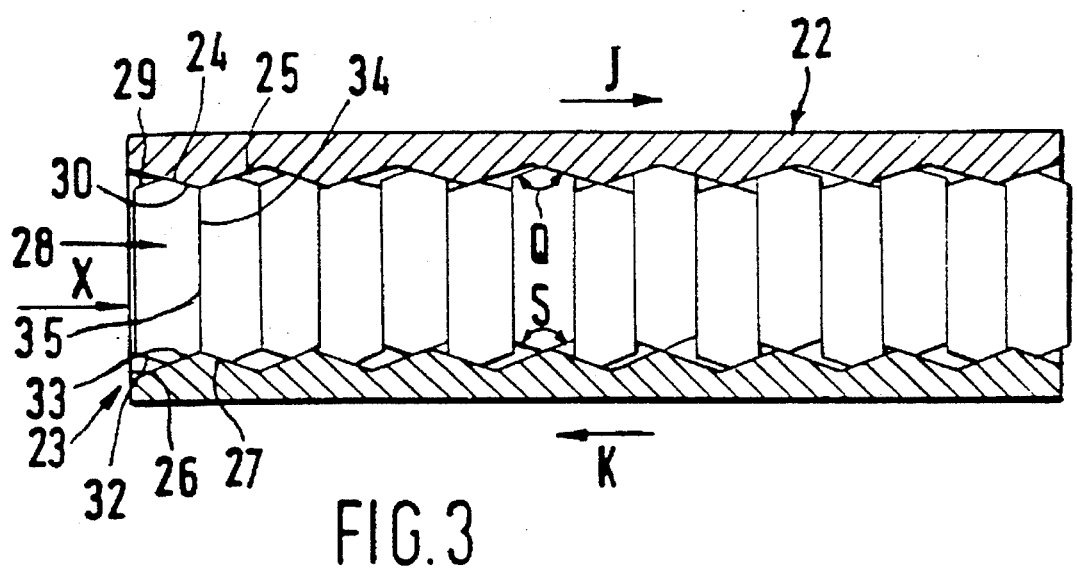
FIG. 3 is a development of cam surfaces with cam followers shown in positions therebetween.

In FIGS. 1 to 3 the differential 10 comprises a drive input housing in the form of a gear 12 which receives drive from a pinion (not shown) in known manner. The gear 12 is drivably connected to hubs 13, 14 which are held in the housing by any suitable method such as screwing into the housing 11 and then locking in position, peening, welding and circumferentially spaced bolts.

Two output cam members 16, 17 have splines 15 at the centre thereof in use, to drive output shafts (not shown) in bores 18 in the hubs 13, 14. The bores 18 each have a helical oil feed groove 19 on the inner surface thereof in use to feed lubrication into the differential. The output members 16, 17 are rotatable in bearings 50 about an axis A relative to the hubs 13, 14. The output members 16, 17 have respective flanges 20, 21 thereon on which are formed respective undulating face cams 22, 23. The cam 22 comprises an annular zig-zag surface shown in detail in FIG. 3 made up from seven pairs of mutually inclined helical surfaces 24, 25. The cam 23 also comprises an annular zig-zag surface apparent from FIG. 3 but is made up from eight pairs of mutually inclined helical surfaces 26, 27. As shown in FIG. 1 the undulating cam surface 22 is inclined at an angle P to the axis A and the cam surface 23 is inclined at angle P2 to the axis A, whereby each cam surface converges towards the other. The cams 22,23 represent n-1 and n pairs of inclined faces. Other combinations of faces such as n-2 n, n-3 n, may be used.

Fifteen cam followers 28 are positioned between the cams 22, 23. Each cam follower is of strut-like elongate form and comprises two sets of mutually inclined end surfaces 29, 30, and 33 which terminate at relatively longer side surfaces 34, 35. The angle of inclination Q between the end surfaces 29, 30 corresponds to the angle of inclination between the cam surfaces 24, 25 and the angle of inclination S between the end surfaces 32, 33 corresponds to the angle of the inclination between the cam surfaces 26, 27. The end surfaces 29, 30 are also inclined at angle P and the end surfaces 32, 33 are inclined at angle P2 as apparent from FIGS. 1. When viewed from the end each cam follower is arcuate which enables the followers to be assembled together as viewed in FIG. 2. Each cam follower has an arcuate embrace of substantially 360/nf degrees where nf is the number of cam followers. However, if desired, the arcuate embrace may be less to leave clearance spaces 28' (See FIG. 4) between the followers.

Figure 4:
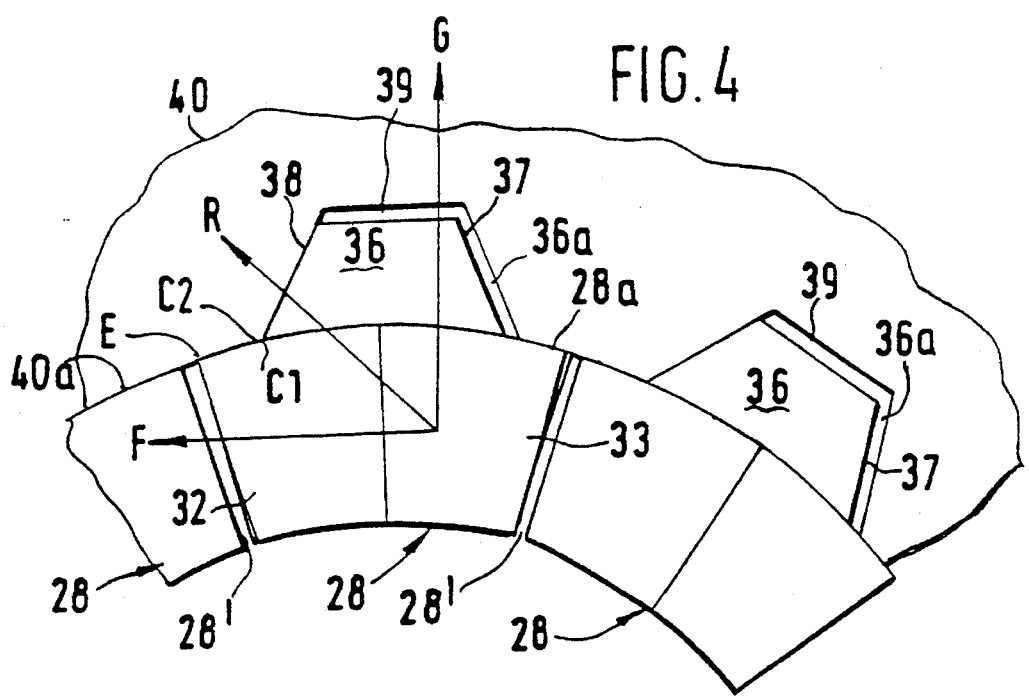
FIG. 4 is a diagrammatic end view of a follower.

Each cam follower includes an elongate drive dog 36 having mutually inclined side surfaces 37, 38 (FIG. 4). The drive dogs 36 locate with slight clearance 36a in complementary shaped grooves 39 formed in the inner periphery of a cylindrical drive input element 40 formed on input housing 11. The clearance 36a is just sufficient to ensure that the arcuate outer periphery (indicated at 28a) of each follower 28 can abut the inner peripheral surface (40a) of the drive input element 40. The grooves 39 provide support for the followers 28 at least adjacent their axial ends and preferably, as shown for substantially their entire length.

As apparent from FIGS. 2 and 3 the assembly of the cam followers is preferably such as to place the side surfaces 34, 35 of adjacent followers so that they interengage or lie closely adjacent. In that way maximum use is made of the available circumferential space for the cam followers, the followers together forming a substantially continuous and compact annular array as viewed in FIG. 2.

When drive input is applied through drive input element 40, and assuming that a vehicle having the differential is being driven in a straight line, the cam followers apply a load to the surfaces of cams 22, 23 so as to rotate the output members 16, 17 at equal speeds. As apparent from FIG. 3, with driving load applied in direction X the cam follower on the extreme left has its end surfaces 30, 33 in driving engagement with surfaces 24, 26 and alternate followers are similarly in driving engagement with the cams 22, 23. However intermediate cam followers have their surfaces in non-driving engagement with the cam surfaces.

The driving force applied by the followers 28 to the inclined surfaces 24, 26 produces a reaction force F as illustrated in FIG. 4. The inclination of the end surfaces of the cam followers at angle P and P2 causes the application of forces, which is shown only for cam 22 having the angle P. The application of force F to create an outward force G thereby producing a resultant force R which passes radially outboard of edge E preferably approximately through or adjacent a corner C1 between the drive dog 36 and an adjacent outer peripheral part 40a of the follower 28. In that way the loading on the cam follower tends to wedge it firmly against a corner C2 of the drive input element.. 40 in such a way that tipping of the follower about its edge E is avoided.

The differential effect can best be appreciated considering the driving element 40 as being stationary and by applying contra rotary movement to the cams 22, 23 in direction J, K respectively in FIG. 3. The cam surfaces 26 will move to the left and cam surfaces 24 to the right. Such movement of the cam surface 26 causes the associated follower to move axially towards cam 22. If both cams 22, 23 and the drive input element 40 are all given an additional rotational movement in direction of arrow J, it will be appreciated that the cams 22 and 23 will be rotating respectively faster and slower than element 40. The difference in speeds between the two cams 22, 23 and the drive input element 40 will result from the different number of cam surfaces on the cams. As there is a considerable amount of friction between the followers and the cams, torque will be transmitted to one cam even when the other is drivably connected to an axle with a wheel spinning on a slippery surface which is highly advantageous over conventional differential systems. The moving of one axle faster than the other will result in a reduction in net torque applied to that wheel through the associated cam due to the load applied by the axially moving cam followers to which input torque is applied. There will be, in that case, an increase in the net torque applied at the other cam and the ratio between the net torques will be dependent upon the values of the angles Q, S. The greater the angles, the greater will be the friction at the cam surfaces due to axial loading applied thereto by the followers. The angles Q, S are normally selected whereby the face cams may drive the cam followers axially but mere axial movement of the cam followers cannot drive the face cams. However, if desired, the angles Q, S can be selected to provide a degree of reversibility.

As mentioned above, the adjacent cam followers may be arranged with their side surfaces 34, 35 closely adjacent or in inter-engagement, driving force F applied to say follower 28 in non-driving engagement with cam surfaces may be arranged to transmit driving load applied thereto to the next driving follower through the interengaging surfaces. Also the use of interengaging surfaces further inhibits the cam followers tipping relative to the cams.

Interengagement of the surfaces will take place over substantially their entire length.

The torque ratio requirement between the two net torques of the inside and outside output shafts in a corner is higher in some applications than others. Where high torque differentials are required say from 3:1 to 5:1 this can cause problems with wear rates between the cam followers and the cam surfaces.

By increasing the frictional engagement between one of the cam output members 14, 17 and the input element the torque ratio for a given differential can be increased. Further by selecting the cam output member 23 which has the higher number of pairs of inclined surfaces 26, 27, then the mean torque difference can be increased and the spread in torque difference between right and left hand turns can be decreased upto a particular level of friction engagement.

Beyond that point, any increase in frictional engagement might cause the torque spread to go into reverse, with say the maximum ratio shifting from the left hand turn to a right hand turn and the spread thereafter increasing.

With reference to FIG. 1, a thrust washer 51 (a friction washer) is located between the output cam member 170 and the input member 14 and can be supported on, if necessary, shims 52 for setting the required axial position of the cam 23.

Axial thrust applied to the cams by the followers is transmitted to the input members 14 through the thrust washer 51 and to the input member 13 by thrust needle washer bearings 53. Again shims 52 may be used to adjust the relative axial positions of the cams. A belleville washer 54 (shown compressed into a flat configuration in FIG. 1) may be arranged to act against a bearing washer 55 to urge the followers 28 into firm engagement with the cams 22, 23. The urging of the followers against the cams also creates a radially outward force on the followers 28 resulting from the angles of inclination P and P2 and addition helps to reduce backlash.

The needle washer bearing 53 could be replaced by a thrust washer of a lesser friction engagement than the other thrust washer 51. This could be achieved by using a different material having a lesser coefficient of friction or also by having a friction washer act against the output member 13 radially inwardly of the other thrust washer 51.

In FIG. 1 it can be seen that the angles of inclination to the axis A of the undulating surfaces of cams 22, 23 are different, the undulating surface of cam 22 being inclined at angle P and the undulating surface 2 of cam 23 being inclined at angle P2. The cam followers 28 have similarly inclined end surfaces 29, 30 and 32, 33. The end surfaces 29, 30 are also mutually inclined at the same angle as helical surfaces 24, 25 of cam 22 and end surfaces 32, 33 are inclined at the same angle as helical surfaces 26, 27 of cam 23.

As the angle of inclination between the surfaces 24, 25 is different from that between surfaces 26, 27 the division of torque between the output shafts (indicated at 5, 6 in FIG. 18) splined to the cams 22, 23 will be different when the cams are turning relative to each other in one direction than when they are turning relatively in the opposite direction.

It has been found that appropriate selection of angles P and P2 can affect the ratio of torques transmitted to the shafts. The ends of the cam follower 27, being inclined at different angles P and P2, also aids the correct assembly of the differential.

I claim:

1. A differential mechanism comprising: two output cam members rotatable about an axis each said member having a single annular cam surface thereon of undulating form comprising pairs of mutually inclined surfaces, one of said cam members having a different number of said pairs of inclined surfaces thereon than the other of said cam members, the cam surfaces on the cam members being frusto conical and converging towards each other, and a plurality of cam followers having end surfaces engaging the cam surfaces of the output cam members, the arrangement being such that relative contra rotation of said output cam members causes the cam followers to slide axially, and an input element engaging the followers which are slidably supported by the input element and moving the followers circumferentially relative to the output cam members, the input element engaging with a radially outer portion of each cam follower to move the follower circumferentially relative to the cam output members, and supporting the two cam output members against axially outward movement during drive of the cam output members through the followers, wherein the output cam member having the higher number of pairs of inclined surfaces thereon frictionally engages the input element with a higher frictional force than the other output cam member in order to reduce the difference between the torque cutout ratio of the output cam members when making a right-hand turn compared with the torque output ratio when making a left-hand turn.

2. A differential mechanism according to claim 1 in which the output cam member with the higher number of pairs of inclined surfaces thereon engages the input element through a thrust washer rotationally fast with one of the input element and said higher number output cam member and the other output cam member engages the input element through a rolling element thrust bearing.

3. A differential mechanism according to claim 1 in which both output cam members engage the input element through thrust washers rotationally fast with one of the input element and the the respective output cam member, the thrust washer associated with the output cam member with the higher number of pairs of inclined surfaces thereon having a higher coefficient of friction than the thrust washer associated with the other output cam member.

4. A differential mechanism according to claim 1 in which which both output cam members engage the input element through thrust washers rotationally fast with one of the input element and the the respective output cam member, the thrust washer associated with the output cam member with the higher number of pairs of inclined surfaces thereon engaging the input element at a location radially inwardly of the thrust washer associated with the other output cam member.

5. A differential mechanism according to claim 1 in which resilient means acts between a portion of the input element and one of the output cam members so as to urge said one cam member towards the other.

6. A differential mechanism according to claim 5 in which the resilient means is a belleville washer.

7. A differential mechanism according to claim 1 in which the input element comprises a housing having bores for output shafts which extend from the cam output members, and said bores have an oil feed passageway therein for the lubrication of the differential.

8. A method of altering the torque output ratio of a differential of the type comprising two output cam members rotatable about an axis, each said member having a single annular cam surface thereon of undulating form comprising pairs of mutually inclined surfaces, one of said cam members having a different number of said pairs of inclined surfaces thereon than the other of said cam members, the cam surfaces on the cam members being frusto conical and converging towards each other, and a plurality of cam followers having end surfaces engaging the cam surfaces of the output cam members, the arrangement being such that relative contra rotation of said output cam members causes the cam followers to slide axially, and an input element engaging the followers which are slidably supported by the input element and moving the followers circumferentially relative to the output cam members, the input element engaging with a radially outer portion of each cam follower to move the follower circumferentially relative to the cam output members, and supporting the two cam output members against axially outward movement during drive of the cam output members through the followers, wherein the output cam member having the higher number of pairs of inclined surfaces thereon frictionally engages the input element with a higher frictional force than the other output cam member in order to reduce the difference between the torque output ratio of the output cam members when making a right-hand turn compared with the torque output ratio when making a left-hand turn, said method comprising: causing the output cam member having the higher number of pairs of inclined surfaces thereon, to frictionally engage the input element with a higher frictional force than the other output cam member in order to reduce the difference between the torque output ratio of the output cam members when making a right hand turn.

* * * * *